(12) United States Patent
Camenisch et al.

(10) Patent No.: US 8,015,398 B2
(45) Date of Patent: Sep. 6, 2011

(54) SET MEMBERSHIP PROOFS IN DATA PROCESSING SYSTEMS

(75) Inventors: Jan Leonhard Camenisch, Thalwil (CH); Rafik Chaabouni, Vesenaz (CH); Abhi A. Shelat, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 12/328,808

(22) Filed: Dec. 5, 2008

(65) Prior Publication Data

US 2009/0300347 A1 Dec. 3, 2009

(30) Foreign Application Priority Data

Dec. 6, 2007 (EP) .................................... 07122459

(51) Int. Cl.
*H04L 29/06* (2006.01)
(52) U.S. Cl. ................... 713/155; 713/156; 713/150
(58) Field of Classification Search .................. 713/155, 713/156, 150
See application file for complete search history.

(56) References Cited

OTHER PUBLICATIONS

On the cunning power of cheating verifiers: Some observations about zero knowledge proofs; Oren, Yair; Foundations of Computer Science, 1987., 28th Annual Symposium on; Publication Year: 1987, pp. 462-471.*

Attacks on a Universal Designated Verifier Signature Scheme; Li Yanping; Pang Liaojun; Wang Yuming; Information Assurance and Security, 2009. IAS '09. Fifth International Conference on ; vol. 1 ; Publication Year: 2009 , pp. 27-30 IEEE Conferences.*
Efficient zero-knowledge identification scheme with secret key exchange ; Allam, A.M.; Ibrahim, I.I.; Ali, I.A.; Elsawy, A.E.H.; Micro-NanoMechatronics and Human Science, 2003 IEEE International Symposium on ; vol. 1 ; Publication Year: 2003 , pp. 516-519 vol. 1.*
Boudot, "Efficient proofs that a committed number lies in an interval", Eurocrypt, pp. 431-444, 2000.
Lipmaa, "Statistical zero-knowledge proofs from diophantine equations", Cryptology ePrint archive, Report 2001/086,2001.
Lipmaa, "On Diophantine complexity and statistical zero-knowledge arguments", in Chi-Sung Laih, editor, Asiacrypt, vol. 2894 of Lecture Notes in Computer Science, pp. 398-341.

* cited by examiner

*Primary Examiner* — David Y Jung
(74) *Attorney, Agent, or Firm* — Gail H. Zarick

(57) ABSTRACT

A method and apparatus for proving and a method and apparatus for verifying that a secret value is a member of a predetermined set of values. The proving mechanism receives a set of signatures which has respective values in the predetermined set signed using a private key. The proving mechanism sends to the verifying mechanism a commitment on the secret value of the proving mechanism. The proving mechanism and verifying mechanism then communicate to implement a proof of knowledge protocol demonstrating knowledge by the proving mechanism of a signature on the secret value committed to in the commitment, thus proving that the secret value is a member of the predetermined set.

25 Claims, 2 Drawing Sheets

SET MEMBERSHIP PROOFS IN DATA PROCESSING SYSTEMS

CROSS-REFERENCE TO RELATED APPLICATIONS

This application claims priority under 35 U.S.C. §119 from European Patent Application No. 07122459.6 filed Dec. 6, 2007, the entire contents of which are incorporated herein by reference.

BACKGROUND OF THE INVENTION

1. Field of the Invention

This invention relates generally to set membership proofs in data processing systems whereby a proving mechanism proves to a verifying mechanism that a value secret to the proving mechanism is a member of a public set.

2. Description of the Related Art

Many cryptographic processes performed in data processing systems use a proving mechanism (prover) to prove to a verifying mechanism (verifier) that a secret value of the prover lies in a published set of values. Such set membership proofs are fundamental for building privacy and security into operation of numerous types of data processing systems in their increasing involvement in the tasks of everyday life. An exemplary system might involve a laptop, mobile phone or other data processing device in communication with a remote device, e.g. a server via the Internet, with a view to accessing a restricted service or other resource. Another example might involve some form of smart-card reader reading an inserted card, with communication occurring between the card reader and a processor on the card, or between the reader and a remote verifier mechanism, to verify parameters encoded in the card. The set membership proof itself could form the basis of various tasks implemented by the data processing system, for instance demonstrating possession of a certificate with an attribute in a given set. For example, an id card stating that one lives in a particular town, or that a certificate is still valid, i.e. that the certificate is contained on a list of valid certificates. Numerous other systems and applications involve use of this basic cryptographic process. In general, set membership proofs can be performed for any defined set of values. These may be arbitrary values, or a set of consecutive values. In the latter case, the proof involves proving that a secret value lies in a given interval [A,B] and is often referred to as a range proof.

Like many cryptographic processes, set membership proofs involve the concept of "commitment". If a prover wants to commit to a secret value $\sigma$, the prover can hide the secret into a commitment C and release the commitment to the verifier. For example, a standard method to cryptographically commit to a secret $\sigma$ is to randomly choose a value $r \in_R [1, p-1]$ and compute $C = g^\sigma h^r \pmod{p}$, where p is a prime number, and g and h are generators of a group G which is the multiplicative group of integers modulo p. The commitment C is perfectly hiding (meaning that it will leak no information about the secret $\sigma$) and computationally binding (meaning that bounded computational resources ensure the prover cannot cheat on the value of the secret $\sigma$). Along with the commitment, the prover will often also have to provide a "proof of knowledge" to the verifier. The proof of knowledge demonstrates to the verifier the fact to be proved about the secret in question, in this case that the secret value lies in the required set. The proof of knowledge protocol typically involves the sending of a further commitment, followed by steps of challenge and response, whereby the protocol commitment is sent to the verifier, the verifier sends a challenge to the prover, and the prover responds to the verifier enabling the verifier to verify what is to be proved. Ideally, the proof of knowledge will be a "zero-knowledge" proof, meaning that it does not reveal to the verifier anything other than the particular fact(s) to be proved.

Various set membership proofs are known in the art. These prior techniques rely on use of cryptographic algorithms to prove that the secret value has certain properties which are appropriate to the range or other set in question. For instance, it might be demonstrated that a binary representation of the secret value has sufficiently many bits for the required range. As another example, it might be proved that a secret value $\sigma$ lies in an interval [A,B] by demonstrating that (B−$\sigma$) and ($\sigma$−A) are both positive. Particular examples of prior techniques are described in the following: Boudot, "Efficient proofs that a committed number lies in an interval", EUROCRYPT, pp. 431-444, 2000; Lipmaa, "Statistical zero-knowledge proofs from diophantine equations", Cryptology ePrint archive, Report 2001/086,2001; Lipmaa, "On Diophantine complexity and statistical zero-knowledge arguments", In Chi-Sung Laih, editor, ASIACRYPT, volume 2894 of *Lecture Notes in Computer Science*, pp. 398-415, Springer 2003; Schoenmakers, "Some efficient zero knowledge proof techniques", Monte Verita, March 2001; and Schoenmakers, "Interval proofs revisited", Milan, Italy, September 2005. However, depending on the size of the set in question, these proofs are not efficient or, in the case of range proofs, are not accurate (i.e. for the proof to work the secret value has to lie in a smaller interval).

SUMMARY OF THE INVENTION

One aspect of the present invention provides a method for proving to a verifying mechanism of a data processing system that a value secret to a proving mechanism of the system is a member of a predetermined set of values. The method includes: sending to the verifying mechanism a commitment on the secret value of the proving mechanism; receiving at the proving mechanism a set of signatures which has respective values in the predetermined set signed using a private key; and communicating with the verifying mechanism to implement a proof of knowledge protocol demonstrating knowledge by the proving mechanism of a signature on the secret value committed to in the commitment.

Thus, in contrast to the prior techniques discussed above, the present invention employs a signature-based technique for implementing set membership proofs. For the set of values in question, each value can be signed by some authority using a private key. The resulting signature set is made available to the prover. The prover then engages with the verifier in a proof of knowledge protocol demonstrating that the prover knows an authorized signature on the committed secret value. The prover can only do this if the secret value lies in the required set, and hence the set membership proof is effected. This signature-based system provides an improved efficiency and greater accuracy than the techniques of the prior art discussed above.

In general, the signing authority may be the verifier itself or some other party trusted by the verifier. The signatures may be sent directly to the prover, for example each time a proof is made, or may be otherwise published for access by the prover when desired. In any case, the private key used for generating the signature set is preferably unique to the predetermined set of values for security reasons. In particular, use of a unique private key ensures that the membership proof cannot be made for another value, outside of the predetermined set of values required by the verifier, on which the same signature has been published.

In preferred embodiments described in detail below, the prover sends to the verifier an encoded value which encodes the signature on the secret value, and the proof of knowledge demonstrates that the encoded value encodes a signature on the secret value used to generate the prover's commitment.

A second aspect of the invention provides a method for verifying at a verifying mechanism of a data processing system that a value secret to a proving mechanism of the system is a member of a predetermined set of values corresponding to a published set of signatures which has respective values in the predetermined set signed using a private key. The method includes: receiving from the proving mechanism a commitment on the secret value; and communicating with the proving mechanism to implement a proof of knowledge protocol demonstrating knowledge by the proving mechanism of a signature on the secret value committed to in the commitment.

A third aspect of the invention provides a computer program including program code for causing a computer to perform a method according to the first or second aspects of the invention. It will be understood that the term "computer" is used in the most general sense and includes any device, component or system having a data processing capability for implementing a computer program. Moreover, a computer program embodying the invention may constitute an independent program or may be an element of a larger program. Further, it may be embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

A fourth aspect of the invention provides a proving mechanism for a data processing system for proving to a verifying mechanism of the system that a value secret to the proving mechanism is a member of a predetermined set of values. The proving mechanism including control logic adapted for: sending to the verifying mechanism a commitment on the secret value; receiving a set of signatures which has respective values in the predetermined set signed using a private key; and communicating with the verifying mechanism to implement a proof of knowledge protocol demonstrating knowledge by the proving mechanism of a signature on the secret value committed to in the commitment.

A fifth aspect of the invention provides a verifying mechanism for a data processing system for verifying that a value secret to a proving mechanism of the system is a member of a predetermined set of values corresponding to a published set of signatures which has respective values in the predetermined set signed using a private key. The verifying mechanism comprises control logic adapted for: receiving from the proving mechanism a commitment on the secret value; and communicating with the proving mechanism to implement a proof of knowledge protocol demonstrating knowledge by the proving mechanism of a signature on the secret value committed to in the commitment.

A sixth aspect of the invention provides a data processing system including a proving mechanism according to the fourth aspect of the invention, a verifying mechanism according to the fifth aspect of the invention, and a communications channel for conveying communications between the proving and verifying mechanisms.

BRIEF DESCRIPTION OF THE DRAWINGS

In general, where features are described herein with reference to an embodiment of one aspect of the invention, corresponding features may be provided in embodiments of another aspect of the invention.

Preferred embodiments of the invention will now be described, by way of example, with reference to the accompanying drawings in which.

DETAILED DESCRIPTION OF THE PREFERRED EMBODIMENTS

Figure 1:
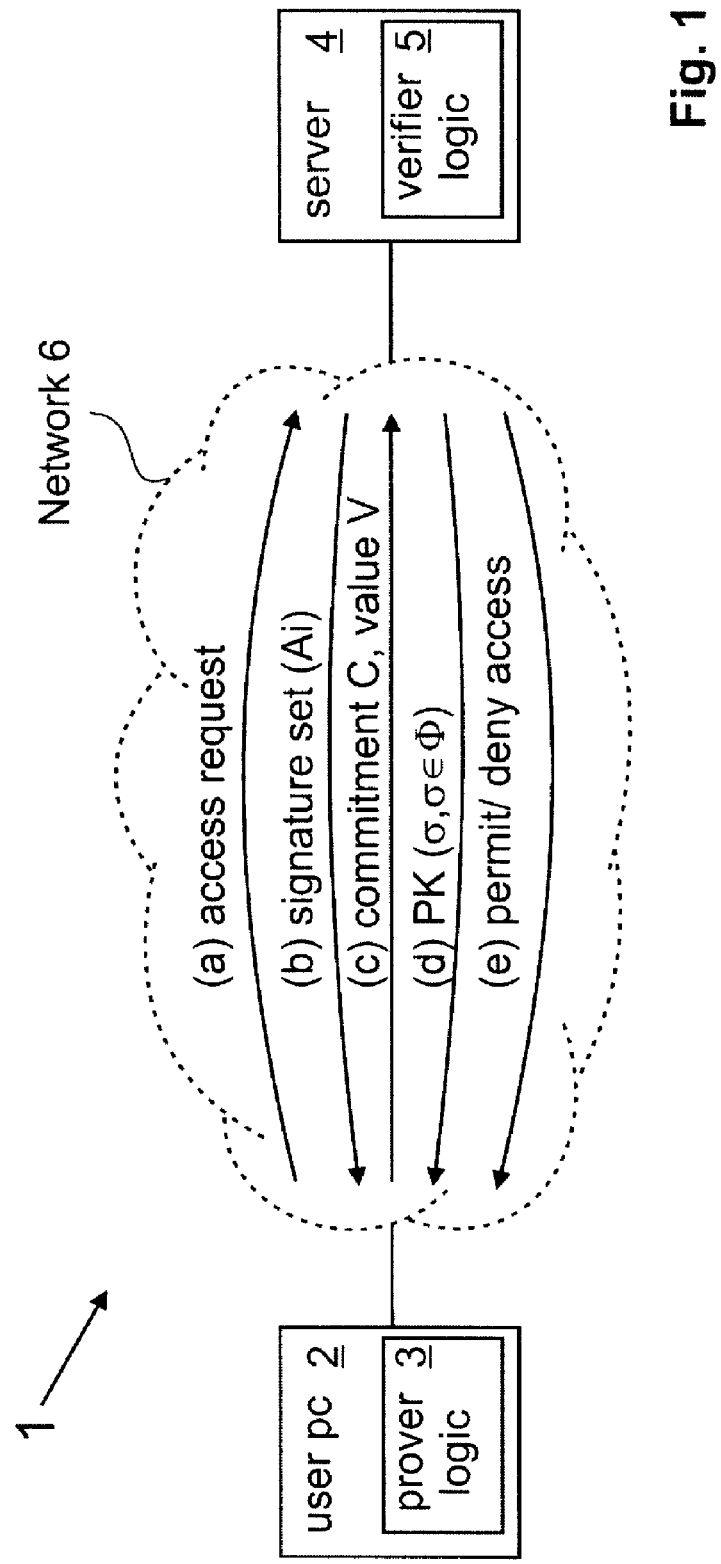
FIG. 1 is a representation of a data processing system showing basic steps in implementation of set membership proving methods embodying the invention.

FIG. 1 is a schematic representation of a simple data processing system in which set membership proving methods embodying the invention may be performed. The system 1 includes a prover device 2 having a proving mechanism implemented by prover logic 3, and a verifier device 4 having a verifying mechanism implemented by verifier logic 5. The prover device 2 and verifier device 4 can communicate via a communications channel provided here via a network 6. The control logic of prover and verifier mechanisms 3, 5 is configured for implementing the appropriate steps of a process involving cryptographic set membership proof as described hereinafter. In general, this control logic may be implemented in hardware or software or a combination thereof, and the specific nature of the proving and verifying devices is largely irrelevant to the fundamental operation of the set membership proving process to be described. In this example, however, the prover device 2 and the verifier device 4 are both implemented by general-purpose computers, the prover device 2 being a user pc and the verifier device 4 being a server to which the user pc 2 can connect over a communication channel 6. The communication channel 6 is implemented as network 6. Prover and verifier logic 3, 5 are implemented here by respective computer programs which configure the host computers to perform the functions described. Suitable software will be apparent to those skilled in the art from the description herein.

In this illustrative scenario, the set membership proof is performed as part of an access control process. In particular, in order for user pc 2 to access a service, such as a restricted web site hosted by server 4, prover logic 3 must demonstrate possession of a valid certificate. This certificate is represented by a value $\sigma$ which is secret to the prover. Verifier logic 5 must be able to verify that the certificate is contained on a list of valid certificates without actually knowing the secret value itself. The heart of this access control process is thus a set membership proof involving proving that the user's secret certificate value $\sigma$ is contained in a set of values $\phi$, known to the verifier, representing valid certificates. The basis for the proof here is a signature-based set membership which takes inspiration from the technique of adaptive oblivious transfer. This technique is detailed in "Simulated adaptive oblivious transfer", Camenisch et al., in Moni Naor, editor, EUROCRYPT, volume 4515 of *Lecture notes in Computer Science*, pages 573-590, Springer 2007. Briefly, however, these oblivious transfers are protocols for information retrieval designed in such a way that the information provider cannot learn which information is requested, and the information receiver does not gain any more knowledge than he asked for.

The arrows labelled (a) to (e) in FIG. 1 represent the main steps of the access control process. In step (a), user pc 2 connects to server 4 requesting access to the service in question. This initiates the process of set membership proof which is represented by steps (b) to (d) in the figure. In step (b), server 4 sends pc 2 a set of signatures $(A_i) \forall i \in \phi$. The signature set $(A_i)$ is sent here as part of an initialization process, exemplified in more detail below, in which various parameters for the subsequent proof are set up between the prover logic 3 and verifier logic 5. In this embodiment, verifier logic 5 generates the signature set $(A_i)$ by signing every element i contained in the set $\phi$. The signatures are generated using a private (signature) key which, in this preferred embodiment, is unique to the set $\phi$. Hence, signatures using this key are not published for values other than those contained in the set $\phi$. In step (c) of this example, prover logic 3 sends a commitment C on the secret value $\sigma$ to verifier logic 5, together with an encoded value V. This encoded value V encodes a signature $A_\sigma$ on the secret value $\sigma$. In particular, since the prover logic has already received, via step (b), a signature on the element $\sigma$ in his commitment C, the prover logic simply has to hide, or "blind", this received signature by encoding it in the value V, and perform a proof that it knows a signature for the committed secret value. (Note that the proof does not then depend on the size of the secret value itself but rather on the cardinality of the set $\phi$ from which the secret value is picked). In step (d) of FIG. 1, prover and verifier logic communicate to implement the proof of knowledge PK $(\sigma, \sigma \in \phi)$ demonstrating that the value V encodes a signature $A_\sigma$ on the secret value $\sigma$, and hence that $\sigma$ is a member of the public set $\phi$. In step (e), server 4 permits or denies the user pc 2 access to the requested service according to whether the set membership proof has been made, i.e. whether user pc 2 holds a valid certificate for the service.

Features of the set membership proof implemented in steps (b) to (d) in this embodiment are as follows. Let g, h be generators of a group $G_1$ of order p such that there exists a bilinear map e: $G_1 \times G_1 \rightarrow G_T$. The public key of the signature-generating authority (here verifier logic 5) is $y=g^x$ where x is the corresponding private key. The signatures $(A_i)$ on the elements i of set $\phi$ are given by $A_i=g^{1/(x+i)} \forall i \in \phi$. (Here we assume that $\phi$ is a subset of $\{1, \ldots, p\}$ which can always be achieved by choosing p to be sufficiently large and by proper encoding of the set $\phi$). The commitment C is computed using the standard technique discussed earlier as $C=g^\sigma h^r$ where r is a random number generated by the prover logic. The encoded value V is derived by the prover logic by generating a random number v and computing $V=(A_\sigma)^v$. The proof of knowledge protocol PK$(\sigma, \sigma \in \phi)$ can be implemented for instance in a protocol denoted by: PK$\{(\sigma,r,v): C=g^\sigma h^r$ AND $e(V,y)=e(V,g)^{-\sigma}e(g,g)^v\}$ where we use here notation introduced in "Efficient Group Signature Schemes for Large Groups" (Extended Abstract), Jan Camenisch and Markus Stadler, Proceedings of CRYPTO 1997: Lecture Notes in Computer Science, Springer Verlag. This protocol proves knowledge of the values $\sigma$, r, and v such that $C=g^\sigma h^r$ and $e(V,y)=e(V,g)^{-\sigma}e(g,g)^v$ hold.

Figure 2:
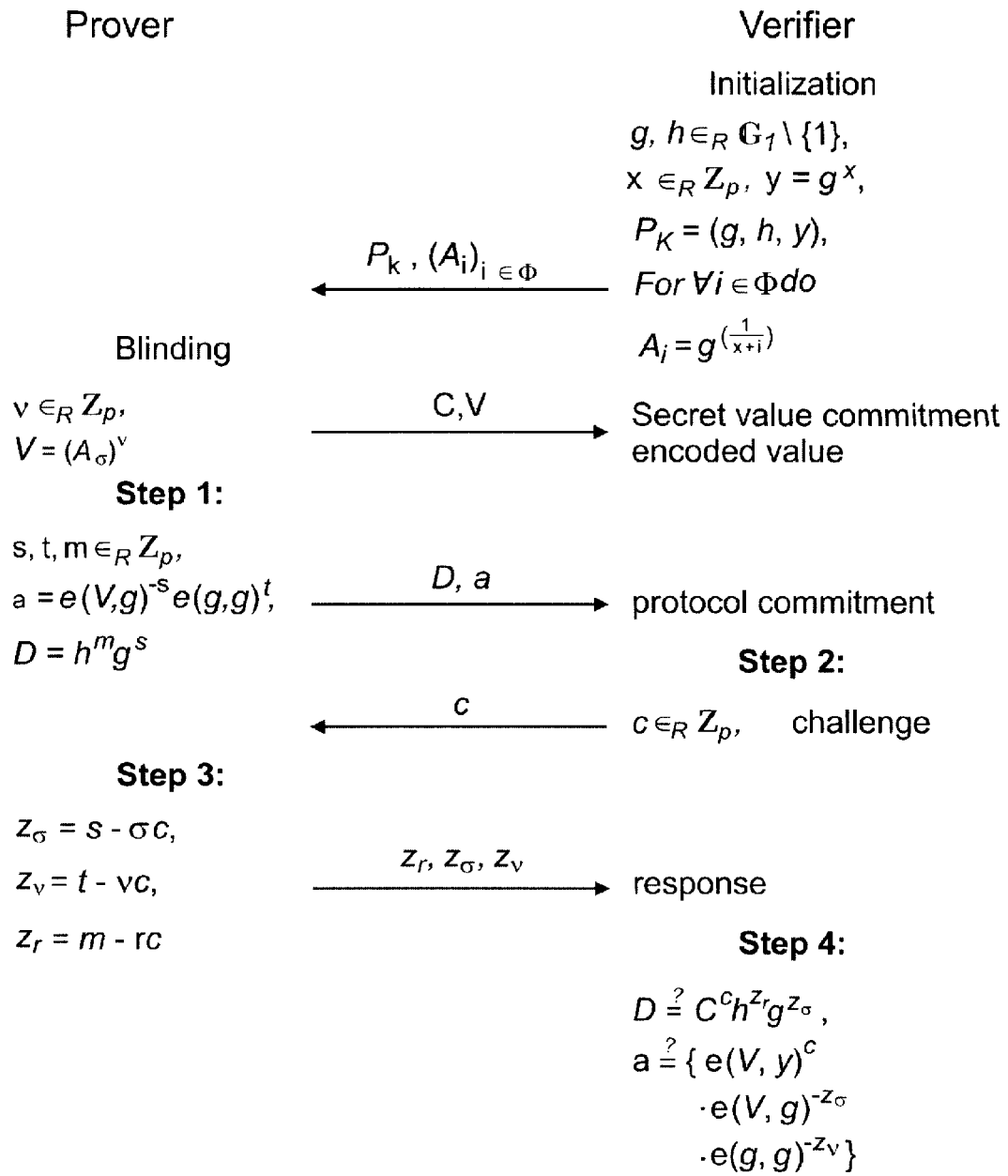
FIG. 2 is a more detailed illustration of operational steps in an exemplary set membership proving system embodying the invention.

A particular example of the above technique is illustrated in detail in FIG. 2. In particular, labelled steps 1 to 4 in this figure implement the protocol above. This protocol requires bilinear groups and associated hardness assumptions. In particular, let PG be a pairing group generator that on input $1^k$ outputs descriptions of multiplicative groups $G_1$, $G_T$ of prime order p where $|p|=k$. Let $G_1^*=G_1 \setminus \{1\}$ and let $g \in G_1^*$. The generated groups are such that there exists an admissible bilinear map e: $G_1 \times G_1 \rightarrow G_T$, meaning that: (1) for all $a,b \in Z_p$ it holds that $e(g^a,g^b)=e(g,g)^{ab}$; (2) $e(g,g) \neq 1$; and (3) the bilinear map is efficiently computable. Here we assume that the strong Diffie-Hellman Assumption (see "Short signatures without random oracles", Boneh et al, in Christian Cachin and Jan Camenisch, editors, EUROCRYPT, volume 3027 of *Lecture Notes in Computer Science*, pages 56-73, Springer 2004) applies. In particular, we say that a q-strong Diffie-Hellman assumption associated with a pairing generator PG holds if for all probabilistic polynomial-time adversaries F, the probability that $F(g, g^x, \ldots, g^{x^q})$ where $(G_1,G_T) \leftarrow PG(1^k)$, $g \leftarrow G_1^*$ and $x \leftarrow Z_p$, outputs a pair $(c, g^{1/(x+c)})$ where $c \in Z_p$ is negligible in k.

The arrows in FIG. 2 indicate the communication flow between the prover logic (Prover) on the left of the figure and the verifier logic (Verifier) on the right. In the initialisation step, the signatures $A_i$ are calculated as indicated, and the various parameters required for the proof are defined and communicated to the prover with the signature set $(A_i)$. Together with the signature set, the verifier sends the value $P_K=(g, h, y)$ as indicated. In the next step, the prover performs the blinding of the signature $A_\sigma$, generating the encoded value $V=(A_\sigma)^v$ which is sent to the verifier, together with the secret value commitment C in this example. The following steps 1 to 4 in the figure illustrate the proof of knowledge PK in detail. In step 1 the prover computes values D, a as indicated and sends these to the verifier. The verifier then sends a challenge to the prover in the form of random number c. The prover responds by calculating and returning the values $z_\sigma$, $z_v$, $z_r$ as indicated. This enables the verifier to perform the necessary verification by the process indicated in step 4.

The above scheme makes use of the elegant Boneh-Boyen short signature described in "Short signatures without random oracles", Boneh et al, referenced above. This can be briefly summarized as follows. The signer's secret key is $x \leftarrow Z_p$ and the corresponding public key is $y=g^x$. The signature on a message m is $S \leftarrow g^{1/(x+m)}$ and verification is done by checking $e(S, y \cdot g^m)=e(g,g)$. This is similar to the Dodis and Yampolskiy verifiable random function described in "A verifiable random function with short proofs and keys", Dodis et al, *Public Key Cryptography*, pages 416-431, 2005. Security under a weak chosen-message attack is defined through the following game. The adversary F begins by outputting l messages $m_1, \ldots, m_l$. The challenger generates a fresh key pair and gives the public key to the adversary, together with the signatures $S_1, \ldots, S_l$ on the messages $m_1, \ldots, m_l$. The adversary wins if it succeeds in outputting a valid signature S on a message $m \notin \{m_1, \ldots, m_l\}$. The scheme is said to be unforgeable under a chosen-message attack if no probabilistic polynomial-time adversary F has a non-negligible probability of winning this game. The scheme of FIG. 2 makes use of a property of the Boneh-Boyen short signature which is paraphrased as follows: supposing the q-Strong Diffie-Hellman assumption holds in $(G_1,G_T)$, then the basic Boneh-Boyen signature scheme is q-secure against existential forgery under a weak chosen-message attack. Our theorem is that, if the $|\phi|$-Strong Diffie-Hellman assumption associated with a pairing generator PG holds, then the FIG. 2 protocol is a zero-knowledge argument of set membership for a set $\phi$.

The foregoing signature-based system for set membership proof provides an elegant and efficient system which can be applied for a set $\phi$ of arbitrary values or as a range proof for a set of consecutive values. For instance, the access requirement in the FIG. 1 scenario could be that the birth-date of the pc user lies in a specified range, e.g. for access to a teenagers' web-site. Moreover, in this case, some form of certificate on the user's age, issued by a trusted authority, might be required for access to the web site. For such purposes, the foregoing protocol can be easily extended to demonstrate further properties of the secret value σ, e.g. that σ is a value certified by some authority, i.e., that the prover holds a credential which has σ as an attribute. This can be done using generally known techniques as will be apparent to those skilled in the art (see for example "A General Certification Framework with Applications to Privacy-Enhancing Certificate Infrastructures", Camenisch, Sommer and Zimmermann, Proceedings of SEC 2006, Springer Verlag). Briefly, however, this can be done by having a certification authority issue a certificate to the prover, the certificate containing as one of the attributes the secret value. Thus, the prover could further prove to the verifier possession of a certificate by the certification authority which contains as an attribute the very same value that is contained in the secret value commitment C. Protocols to execute this proof are well known in the art, as well as protocols that would allow the prover to convince the verifier that a credential held by the prover contains an attribute that is related to the secret value. For instance, the secret value might encode an age, such as 12, and the attribute in the credential might contain the date of birth. The prover could then convince the verifier that the certificate contains a birth date confirming the age as 12 years old.

Various changes can of course be envisaged to the exemplary embodiments described above. By way of example, the signature set ($A_i$) could be generated and published by an authority which is independent of, but trusted by, the verifier. Also, while the initialization parameters for the set membership proof are sent by the verifier in the FIG. 2 embodiment, these could be otherwise provided to the prover. These parameters, might, for instance, be pre-configured in the prover mechanism, or could be published independently for access by the prover when needed. It will of course be appreciated that, while the set membership proof is performed in an access control scenario above, numerous other applications involve use of this basic cryptographic process. Moreover, embodiments of the invention can be employed in numerous data processing systems other than the specific example of FIG. 1, and the prover and verifier in such systems could be implemented by any form of computing device. Various other changes and modifications can be made to the specific embodiments described without departing from the scope of the invention.

We claim:

1. A method of proving to a verifying mechanism of a data processing system that a value secret to a proving mechanism of the system is a member of a predetermined set of values, the method comprising:
   sending to the verifying mechanism a commitment on the secret value of the proving mechanism;
   receiving at the proving mechanism a set of signatures which has respective values in the predetermined set of values signed using a private key; and
   communicating with the verifying mechanism to implement a proof of knowledge protocol demonstrating knowledge by the proving mechanism of a signature on the secret value committed to in the commitment.

2. The method as claimed in claim 1, further comprising:
   generating at the proving mechanism an encoded value which encodes the signature on the secret value;
   sending the encoded value to the verifying mechanism; and
   demonstrating with the proof of knowledge protocol that the encoded value encodes the signature on the secret value committed to in the commitment.

3. The method as claimed in claim 2, wherein the commitment is defined by $C=g^\sigma h^r$ where σ is the secret value, r is a random number, and g and h are generators of a group $G_1$.

4. The method as claimed in claim 3, wherein the set of signatures is defined by $A_i=g^{1/(x+i)} \forall i \in \phi$, where φ is the predetermined set of values and x is the private key.

5. The method as claimed in claim 4, wherein the step of generating the encoded value comprises generating a random number v and computing the encoded value as $V=(A_\sigma)^v$.

6. The method as claimed in claim 1, wherein the private key is unique to the predetermined set of values.

7. The method as claimed in claim 1, wherein:
   the secret value has at least one property associated therewith; and
   the proof of knowledge protocol further demonstrates the property of the secret value.

8. A computer readable article of manufacture tangibly embodying computer readable instructions for executing the steps of a method of proving to a verifying mechanism of a data processing system that a value secret to a proving mechanism of the system is a member of a predetermined set of values according to claim 1.

9. A method of verifying at a verifying mechanism of a data processing system that a value secret to a proving mechanism of the system is a member of a predetermined set of values corresponding to a published set of signatures which has respective values in the predetermined set of values signed using a private key, the method comprising the steps of:
   receiving from the proving mechanism a commitment on the secret value; and
   communicating with the proving mechanism to implement a proof of knowledge protocol demonstrating knowledge by the proving mechanism of a signature on the secret value committed to in the commitment.

10. The method as claimed in claim 9, further comprising the steps of:
    receiving from the proving mechanism an encoded value which encodes a signature on the secret value; and
    demonstrating with the proof of knowledge protocol that the encoded value encodes the signature on the secret value committed to in the commitment.

11. The method as claimed in claim 10, further comprising the steps of:
    signing the values in the predetermined set to generate the set of signatures; and
    sending the set of signatures to the proving mechanism.

12. The method as claimed in claim 11, wherein the commitment is defined by $C=g^\sigma h^r$ where σ is the secret value, r is a random number, and g and h are generators of a group $G_1$.

13. The method as claimed in claim 12, wherein the set of signatures is defined by $A_i=g^{1/(x+i)} \forall i \in \phi$, where φ is the predetermined set of values and x is the private key.

14. The method as claimed in claim 13, wherein the encoded value is defined by $V=(A_\sigma)^v$ where v is a random number.

15. The method as claimed in claim 9, wherein the private key is unique to the predetermined set of values.

16. The method as claimed in claim 9, wherein:
    the secret value has at least one property associated therewith; and
    the proof of knowledge protocol further demonstrates the property of the secret value.

17. A computer readable article of manufacture tangibly embodying computer readable instructions for executing the steps of a method according to claim 9, comprising the steps of:
    receiving from the proving mechanism a commitment on the secret value; and
    communicating with the proving mechanism to implement a proof of knowledge protocol demonstrating knowledge by the proving mechanism of a signature on the secret value committed to in the commitment.

18. A proving mechanism for a data processing system for proving to a verifying mechanism of the system that a value secret to the proving mechanism is a member of a predetermined set of values, the proving mechanism comprising:
 means for sending to the verifying mechanism a commitment on the secret value;
 means for receiving a set of signatures which has respective values in the predetermined set signed using a private key; and
 means for communicating with the verifying mechanism to implement a proof of knowledge protocol demonstrating knowledge by the proving mechanism of a signature on the secret value committed to in the commitment.

19. The proving mechanism as claimed in claim 18, further comprising:
 means for generating an encoded value which encodes the signature on the secret value;
 means for sending the encoded value to the verifying mechanism; and
 means for demonstrating with the proof of knowledge protocol that the encoded value encodes the signature on the secret value committed to in the commitment.

20. The mechanism as claimed in claim 19, wherein the private key is unique to the predetermined set of values.

21. The mechanism as claimed in claim 19, wherein:
 the secret value has at least one property associated therewith; and
 the proof of knowledge protocol further demonstrates the property of the secret value.

22. A verifying mechanism for a data processing system for verifying that a value secret to a proving mechanism of the system is a member of a predetermined set of values corresponding to a published set of signatures which has respective values in the predetermined set signed using a private key, the verifying mechanism comprising:
 means for receiving from the proving mechanism a commitment on the secret value; and
 means for communicating with the proving mechanism to implement a proof of knowledge protocol demonstrating knowledge by the proving mechanism of a signature on the secret value committed to in the commitment.

23. The mechanism as claimed in claim 22, further comprising:
 means for receiving from the proving mechanism an encoded value which encodes a signature on the secret value; and
 means for demonstrating with the proof of knowledge protocol that the encoded value encodes a the signature on the secret value committed to in the commitment.

24. The mechanism as claimed in claim 23, further comprising:
 means for signing the values in the predetermined set to generate the set of signatures; and
 means for sending the set of signatures to the proving mechanism.

25. A data processing system, comprising:
 a proving mechanism having (i) means for sending to a verifying mechanism a commitment on the secret value, (ii) means for receiving a set of signatures which has respective values in the predetermined set signed using a private key, and (iii) means for communicating with the verifying mechanism to implement a proof of knowledge protocol demonstrating knowledge by the proving mechanism of a signature on the secret value committed to in the commitment; and
 a communications channel for conveying communications between the proving and verifying mechanisms;
 wherein the verifying mechanism has (i) means for receiving from the proving mechanism a commitment on the secret value and (ii) means for communicating with the proving mechanism to implement a proof of knowledge protocol demonstrating knowledge by the proving mechanism of a signature on the secret value committed to in the commitment.

* * * * *